United States Patent [19]
Borgardt

[11] Patent Number: 6,089,360
[45] Date of Patent: Jul. 18, 2000

[54] LOCKING ASSEMBLY FOR AUTOMATIC DOORS

[76] Inventor: Ronald Borgardt, 2316 Tifton St., Kenner, La. 70062

[21] Appl. No.: 09/317,064

[22] Filed: May 12, 1999

Related U.S. Application Data

[60] Provisional application No. 60/085,301, May 13, 1998.

[51] Int. Cl.[7] ........................................ B60L 7/00
[52] U.S. Cl. .......................................... 188/162; 188/161
[58] Field of Search .................................. 188/162, 161, 188/158, 156; 192/84.96, 84.961

[56] References Cited

U.S. PATENT DOCUMENTS

| | | | |
|---|---|---|---|
| 3,863,743 | 2/1975 | Rule | 192/84 |
| 5,000,018 | 3/1991 | Eisermann | 70/277 |
| 5,030,181 | 7/1991 | Keller | 475/150 |
| 5,497,860 | 3/1996 | Hendricks | 188/162 |

*Primary Examiner*—Robert J. Oberleitner
*Assistant Examiner*—Devon Kramer
*Attorney, Agent, or Firm*—Garvey, Smith, Nehrbass & Doody, LLC

[57] ABSTRACT

A powered system which would include a motor, a shaft rotated by the electrical motor, and a work piece on the end of the shaft which would impart rotation or movement to a part. There is then provided a bushing, which would rotate in unison with the rotating shaft, and an armature plate engaged around the rotating bushing which would impart rotation to the armature plate in normal working conditions. Secured adjacent the rotating bushing and armature plate, there would be further included a bearing-mounted and field magnet assembly, known in the art, so that when the bearing mounted assembly is electrically engaged, the magnet portion of the magnet assembly would be energized, thus moving the rotating armature plate to engage against the stationary magnet face, which would immediately stop rotation of the armature plate. Because the bushing is engaged in the armature plate, the bushing would likewise be halted in its rotation as would the shaft of the motor. In this fashion, whatever piece is being rotated by the shaft of the motor would immediately cease rotation and the unit would be, in effect, fully stopped.

3 Claims, 8 Drawing Sheets

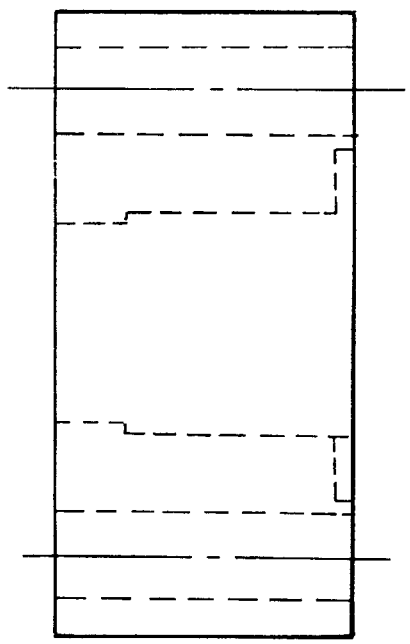
FIG. 10
FIG. 11
FIG. 12
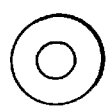

LOCKING ASSEMBLY FOR AUTOMATIC DOORS

CROSS-REFERENCE TO RELATED APPLICATIONS

Priority of U.S. Provisional Patent Application Ser. No. 60/085,301, filed May 13, 1998, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to automatic doors. More particularly, the present invention relates to a mechanism for allowing an immediate locking to occur on movable doors or other types of equipment where one wishes to stop the movement of the equipment substantially instantaneously.

2. General Background of the Invention

There are many industries which would benefit by a system whereby a piece of equipment could be automatically locked upon the locked and rendered immobile by merely throwing a switch. For example, in the automatic door industry, it would be beneficial that doors which slide or swing open and closed in an automatic fashion, have the ability to be locked through, for example, an electrical engagement of a switch so that the door cannot be opened any further. In other industries, for example, industries which utilize turning rotating members such as saw blades, rather than allow an unpowered saw blade to continue to rotate due to the inertia involved with the blades movement, it would be beneficial to have a system whereby the blade would instantaneously stop rotation upon the throwing of the switch. One can imagine how helpful this would be if one were to have one's clothing caught in the blade or even a body part which is being threatened by the blade, rather than hope that the blade stops from its free rotation, that the blade immediately cease rotation upon throwing of a safety switch.

The present invention, seeks to solve that problem by providing a system which can be as positioned as part of a powered unit, whereby upon electronically engaging the system, the power to the unit is immediately ceased and the unit is engaged in the locked position, whether it be a door or other type of equipment where instantaneous stoppage of the equipment is beneficial.

BRIEF SUMMARY OF THE INVENTION

The apparatus of the present invention solves the shortcomings in the art in a simple and straightforward manner. What would be provided in its broadest sense is a powered system which would include a motor, a shaft rotated by the electrical motor, and a work piece on the end of the shaft which would impart rotation or movement to a part. There is then provided a bushing, which would rotate in unison with the rotating shaft, and an armature plate engaged around the rotating bushing which would impart rotation to the armature plate in normal working conditions. Secured adjacent the rotating bushing and armature plate, there would be further included a bearing-mounted and field magnet assembly, known in the art, so that when the bearing mounted assembly is electrically engaged, the magnet portion of the magnet assembly would be energized, thus moving the rotating armature plate to engage against the stationary magnet face, which would immediately stop rotation of the armature plate. Because the bushing is engaged in the armature plate, the bushing would likewise be halted in its rotation as would the shaft of the motor. In this fashion, whatever piece is being rotated by the shaft of the motor would immediately cease rotation and the unit would be, in effect, fully stopped.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 4–10 illustrate representational profile views of the aluminum sections forming the block portion as seen in FIG. 1; and FIGS. 11 and 12 are shaft components utilized in the present invention.

DETAILED DESCRIPTION OF THE INVENTION

Figure 1:
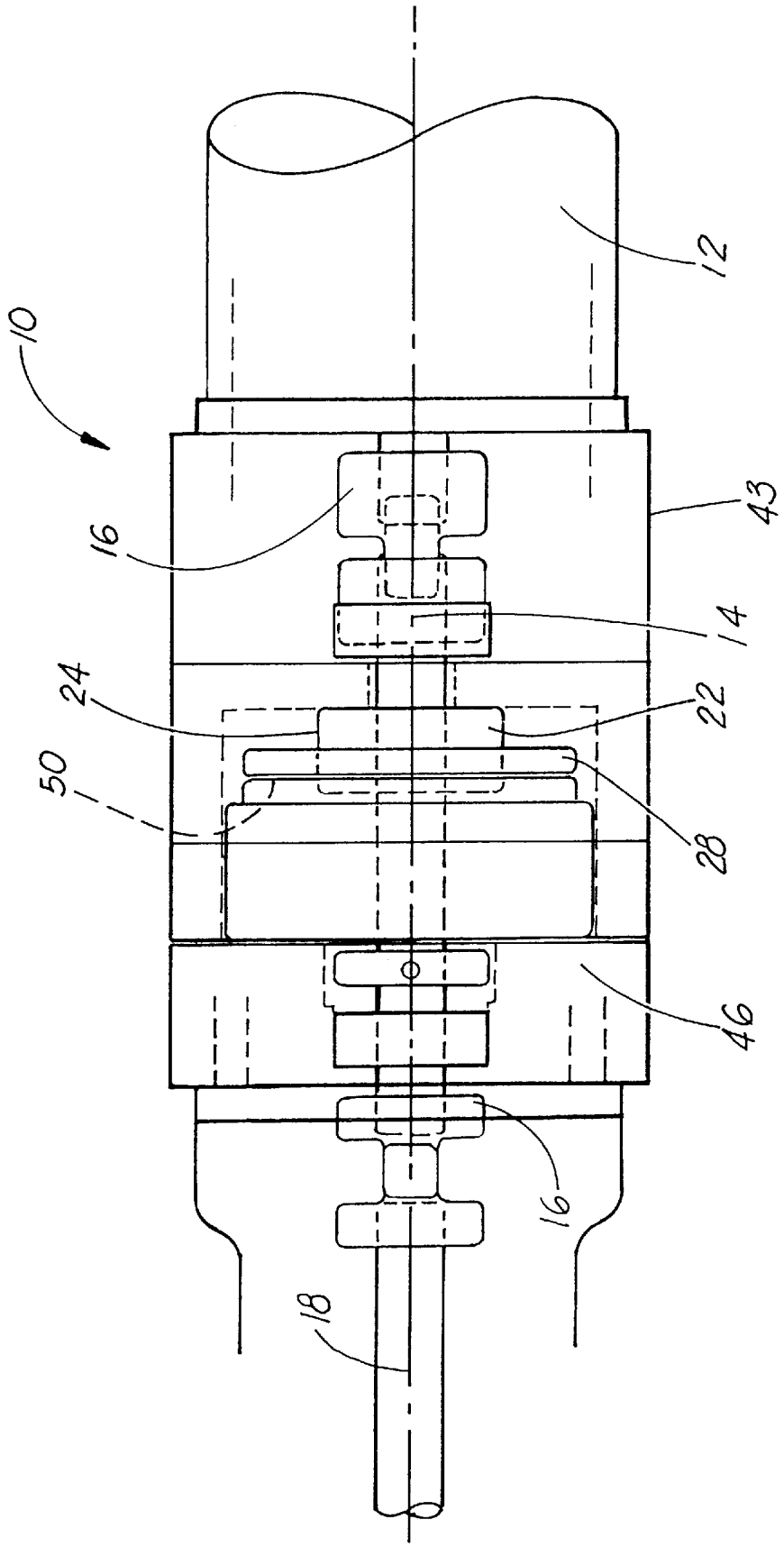
FIG. 1 illustrates a side view of the preferred embodiment of the object of the present invention.
Figure 3:
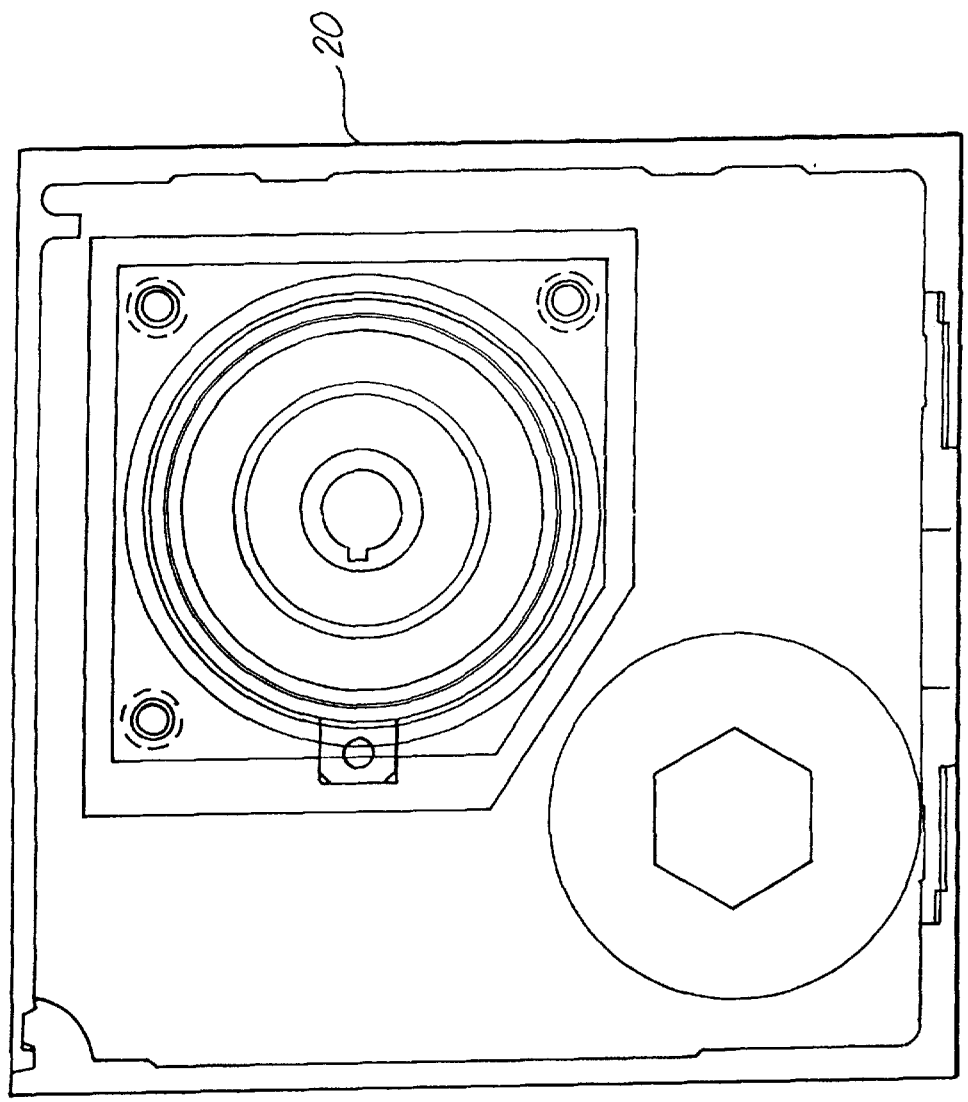
FIG. 3 illustrates a cross section view of the locking assembly for automatic doors secured into the door frame work.
Figure 4:
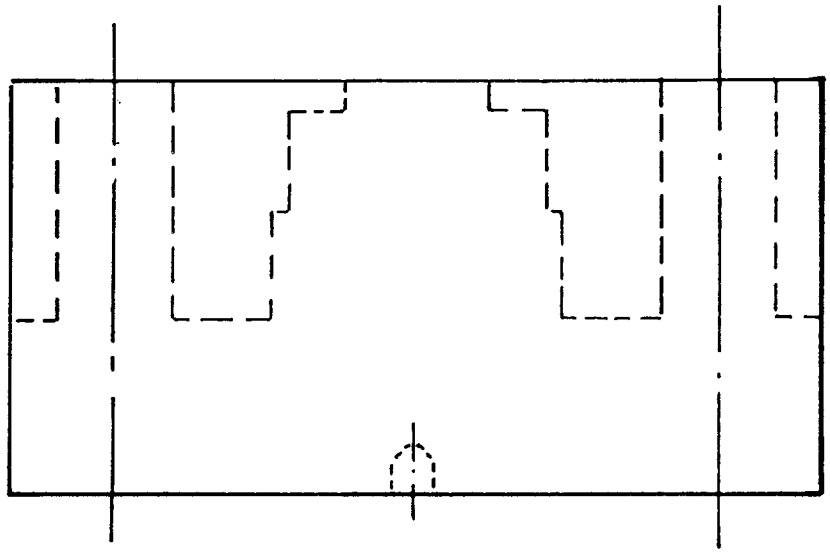
Figure 4:
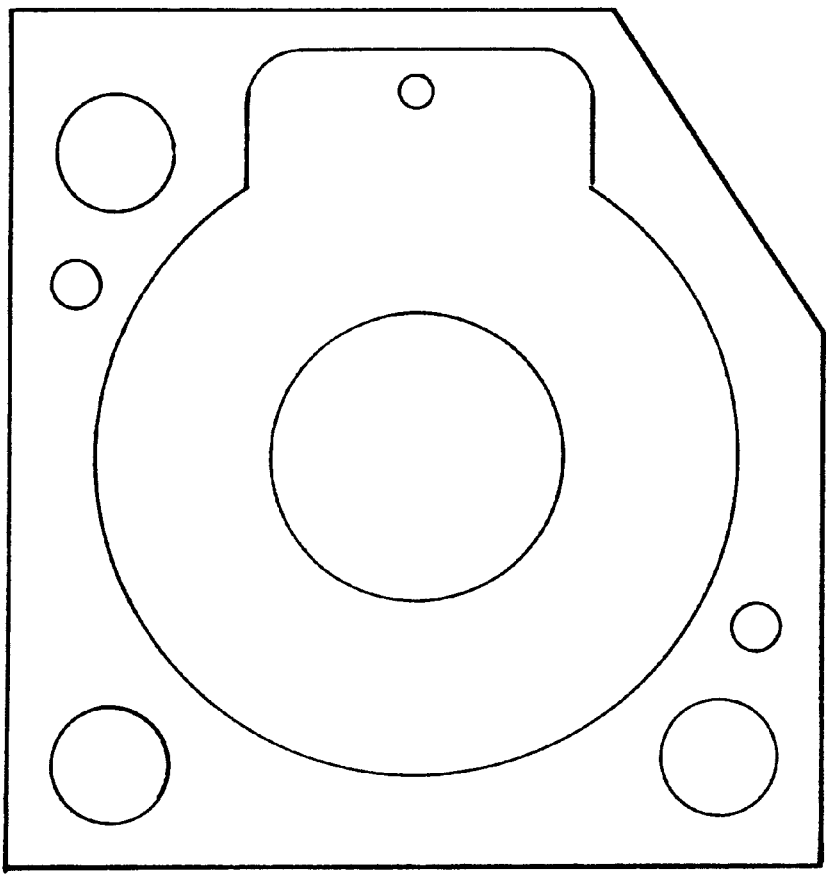
Figure 5:
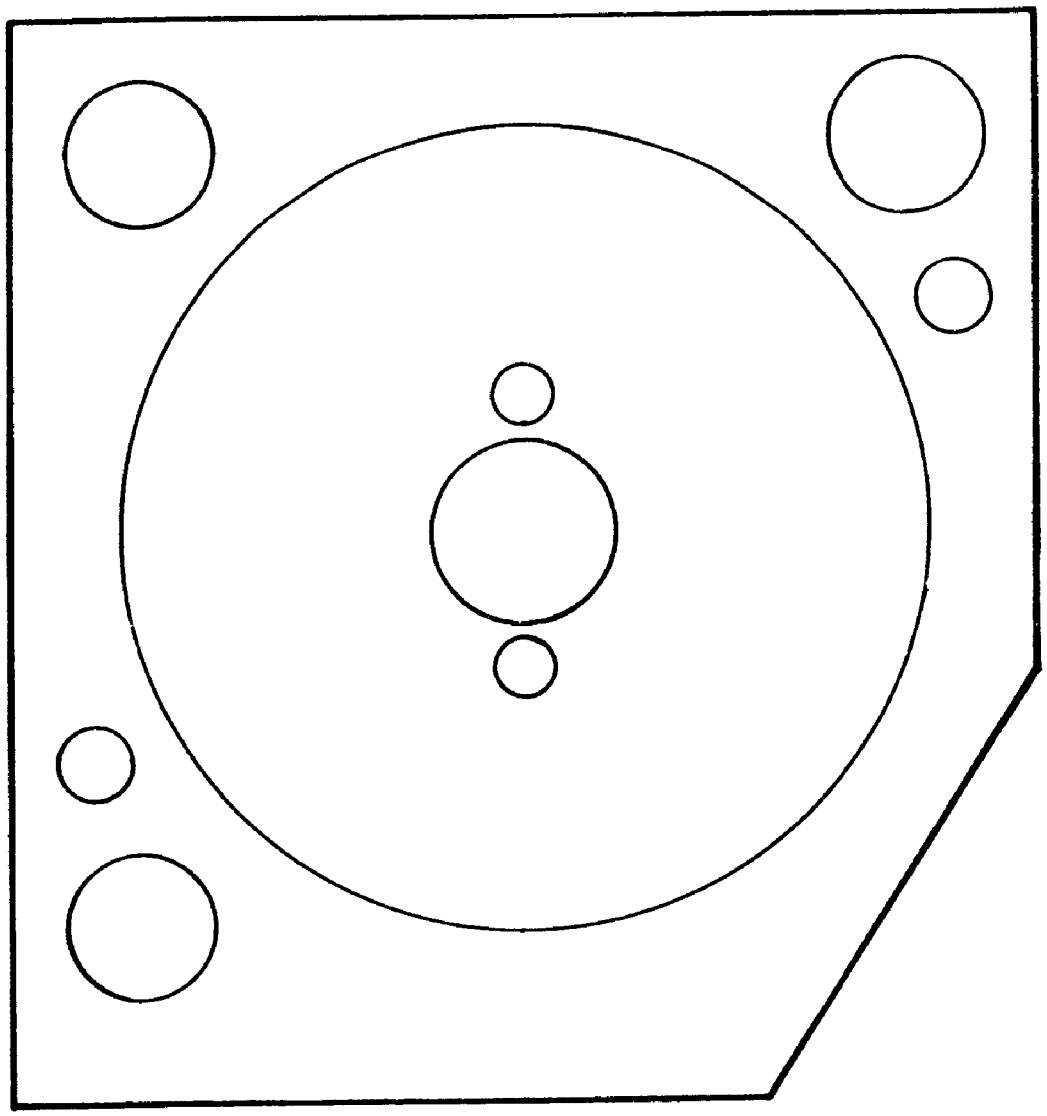
Figure 6:
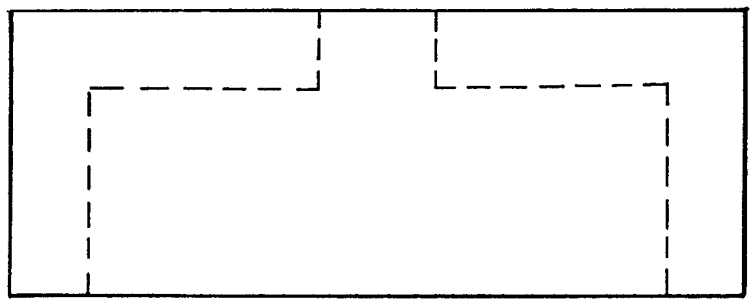
Figure 7:
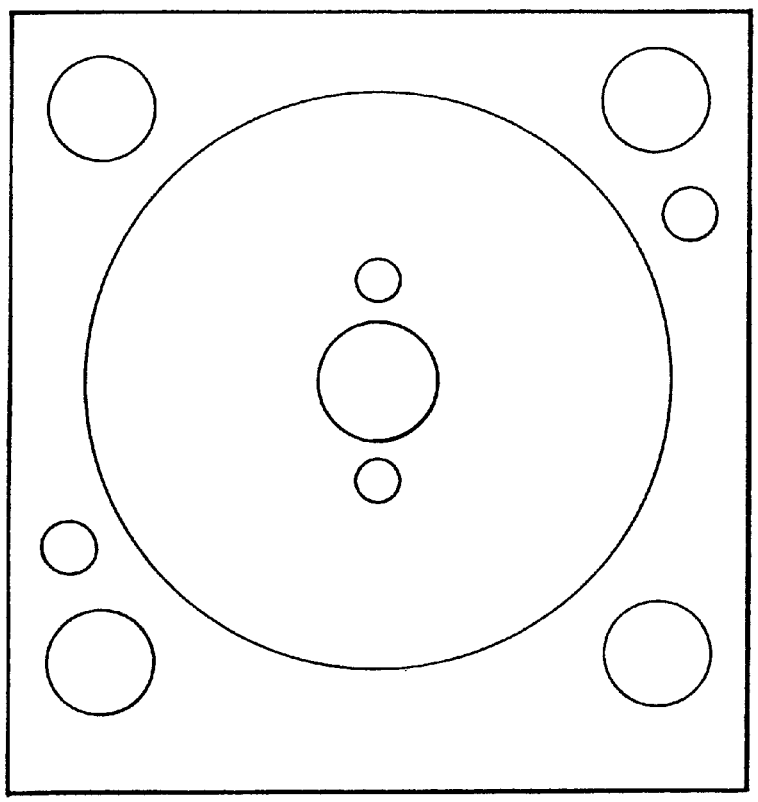
Figure 8:
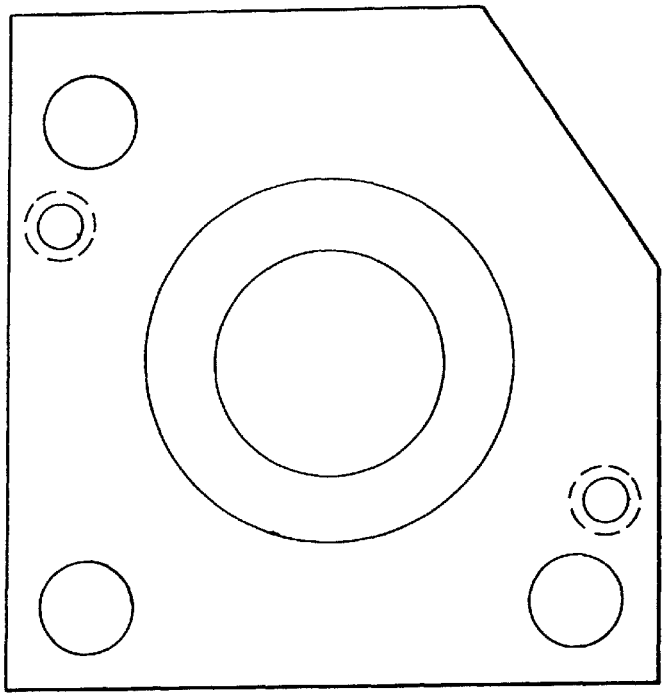
Figure 9:
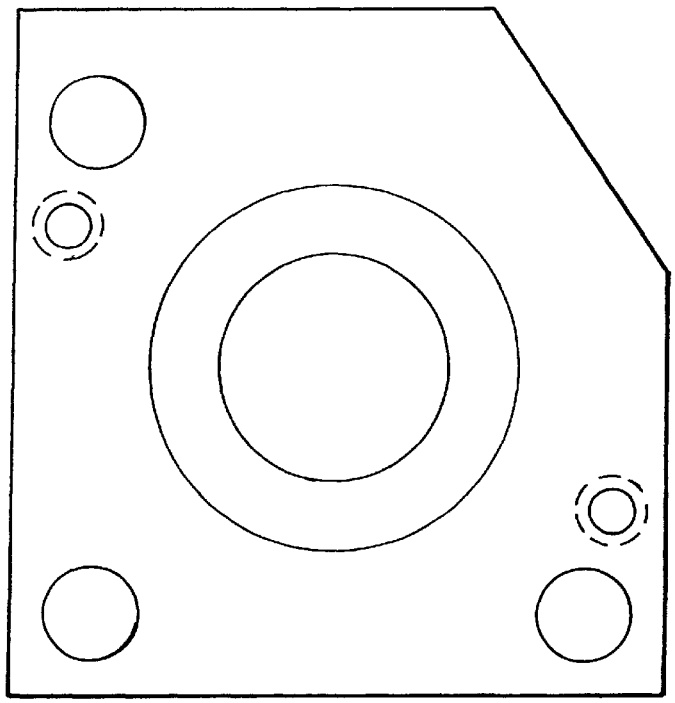

Turning now, in particular, to FIG. 1, there is illustrated the preferred embodiment of the apparatus of the present invention by the numeral 10. As illustrated, the locking assembly for automatic equipment 10 would comprise a motor 12 which may be driven by electricity or may be driven by other power means. Motor 12 may include a shaft member 14 which would be extended from motor 12 and would rotate when rotatably powered by motor 12. Shaft 14 may be a continuous shaft or as illustrated, may include coupling members 16 which would then provide the outermost shaft portion 18 which would then engage to a work piece 20 of the type illustrated in FIG. 3. Of course, work piece 20 may be any type of work piece that is moving, for example, a sliding door or an automatic opening door, or even in its broadest sense, a rotating saw blade or the like which would be immediately locked by the present invention when necessary. Further, FIG. 1 illustrates that the components as enumerated in FIG. 1 are housed within a block portion 43 of the type comprising a series of block sections of the type illustrated in FIGS. 4–12.

Figure 2:
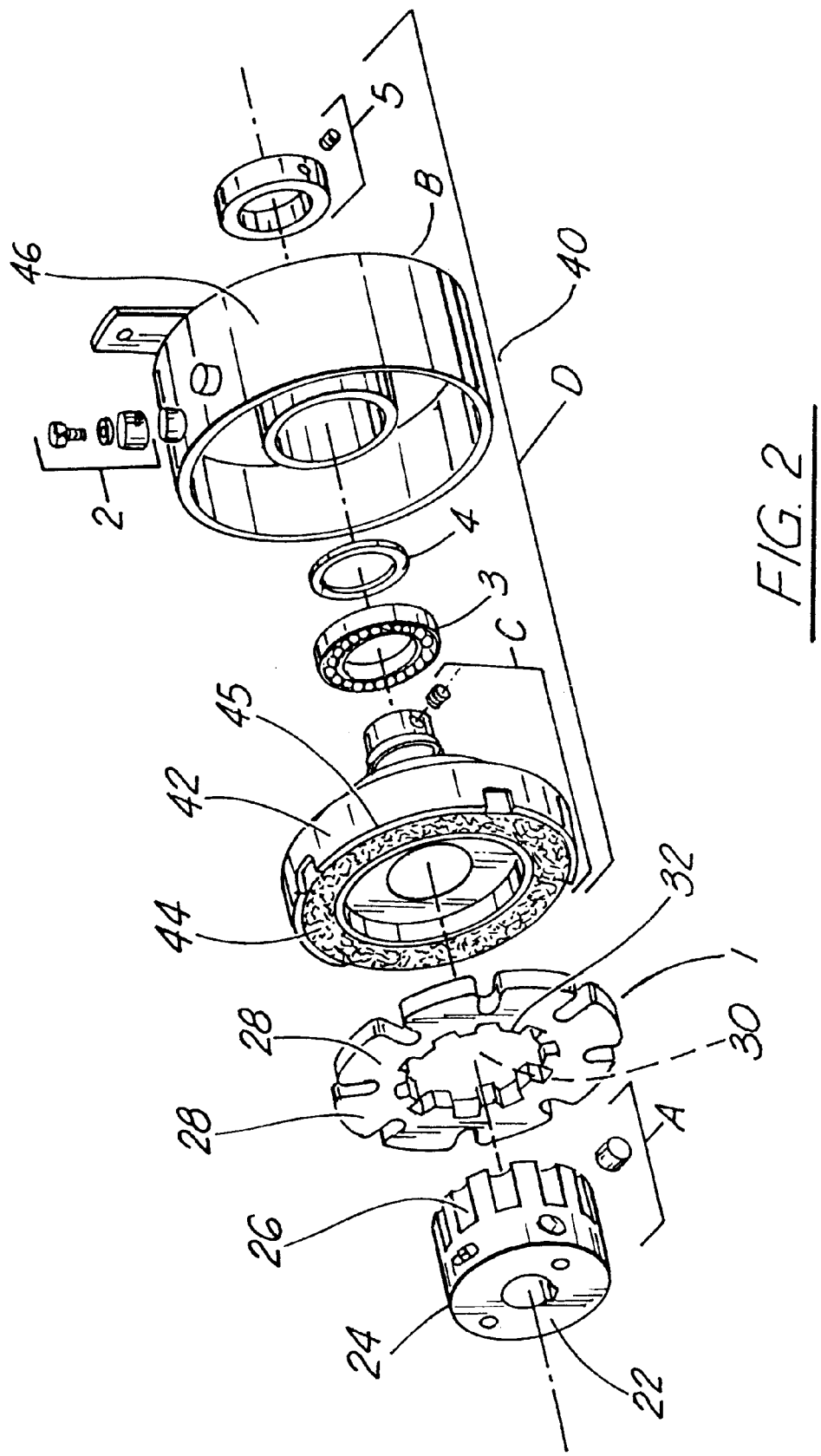
FIG. 2 illustrates an exploded view of the bushing, armature plate and magnet assembly which is utilized in the present invention.

FIG. 2 illustrates an exploded view of the bushing, armature plate and magnet assembly 40 utilized in the present invention that would be engaged between armature plate utilized in the present invention. As illustrated, there would be mounted on shaft portion 14, a bushing member 22, which is a typical type of bushing member having a circular wall portion 24 and a plurality of cut out portions 26. There would further be included an armature plate 28 which would have a central opening 30 which would be substantially the same size as the outer wall 24 of bushing 26 with armature plate 28 having a plurality of teeth 32, each of which would engage into each of the openings 26 of bushing 22 so that rotation of bushing 22 by shaft 14 would impart rotation to armature plate 28 when it is engaged around bushing 22 as illustrated in FIG. 1. There is further included a bearing mounted rotor and field magnet assembly 40 which comprises a rotor assembly 42 having a continuous circular magnet 44, the rotor assembly 42 is engaged within a magnet assembly 46, as illustrated more clearly in exploded view in FIG. 2 and as seen in FIG. 1 also. The magnet assembly 42 would be stationary during the rotation ofthe shaft 14, 18, by motor 12.

It should be noted that there is a particular size gap 50 between the face of the armature plate 28 and the face 45 of magnet 44. This gap in the preferred embodiment would be 0.25–0.125 inches between the rotating rotary plate 28 and the stationary magnet 44. Therefore, when the motor is energized, and the shaft 18 is in full rotation imparting rotation to the armature plate 28 engaged around the bushing 22, the face of the armature plate is that particular distance from the face of magnet 44. In the event that the operator wishes to stop the rotation of shaft 18 immediately, a switch would be energized thus imparting electrical energy to the magnet assembly 42 at which point the rotating armature plate would be magnetically pulled against the face 45 of magnet 44, disengaging from bushing 22, thus rendering it stationary. When this occurs, of course, the bushing 22 is rendered stationary, which stops shaft 18 from rotating and thus stops any item such as a moving door locked in its place when the switch is thrown.

The foregoing embodiments are presented by way of example only; the scope of the present invention is to be limited only by the following claims.

I claim:
1. A locking system for automatic devices, comprising:
   a. a source of power comprising an electrical motor;
   b. a shaft extending from and rotated by the motor;
   c. a bushing member held by the shaft;
   d. an armature plate, slidably positioned around the bushing, and rotatable with the shaft;
   e. a stationary magnet assembly, adjacent the armature plate, so that when electrical energy is supplied to the magnet assembly from a manual switch operated by an operator, the armature plate is drawn into contact with the magnet assembly, and ceases to rotate, causing the rotating shaft stop rotating.

2. A locking system for automatic swinging doors, comprising:
   a. a source of power comprising an electrical motor;
   b. a shaft extending from and rotated by the motor, for imparting movement to the swinging door when the motor operates;
   c. a bushing member held by the shaft;
   d. an armature plate, slidably positioned around the bushing, and rotatable with the shaft;
   e. a stationary magnet assembly, adjacent the armature plate, so that when electrical energy is supplied to the magnet assembly from a manual switch operated by an operator, the armature plate is drawn into contact with the magnet assembly, and ceases to rotate, causing the rotating shaft stop rotating and render the door immobile.

3. The system in claim 1, wherein there is provided a work piece on the end of the shaft to impart movement to a device, such as an automatic swinging door.

* * * * *